United States Patent Office 3,642,833
Patented Feb. 15, 1972

3,642,833
OLEFIN EPOXIDATION
Harald Wulff, Alameda, and Peter Haynes, Berkeley, Calif., assignors to Shell Oil Company, New York, N.Y.
No Drawing. Filed Apr. 2, 1969, Ser. No. 812,921
Int. Cl. C07d *1/08*
U.S. Cl. 260—348.5 L                 11 Claims

ABSTRACT OF THE DISCLOSURE

Olefin oxides are produced by the reaction of an organic hydroperoxide and an olefinically unsaturated compound in the presence of an inorganic siliceous solid having a high surface-to-mass ratio and having a surface of silanol groups as catalyst.

BACKGROUND OF THE INVENTION

The use of organic hydroperoxides in the epoxidation of olefins is known to offer important and distinct advantages over other methods of olefin oxide production. Organic hydroperoxides are relatively inexpensive and convenient and safe to handle. In addition, organic hydroperoxides can readily be obtained and maintained in anhydrous form, thus minimizing potential olefin oxide recovery and purification problems. Also, during the epoxidation reaction, the organic hydroperoxide is converted into the useful corresponding alcohol which also can be readily converted to other valuable products.

A variety of catalysts has been employed for the reaction of olefins with hydroperoxides. One process is that of Smith, U.S. 2,754,325, issued July 10, 1956, wherein soluble heteropoly acids containing transition metals such as chromium, molybdenum and tungsten are employed as homogeneous catalysts for the reaction of olefins and peroxides such as organic hydroperoxides and hydrogen peroxide. More recently, U.S. 3,350,422 and U.S. 3,351,635, issued Oct. 31, 1967, and November 7, 1967, respectively, to Kollar describe the use of solutions of transition metal compounds (V, Mo, W, Ti, Nb, Ta, Re, Se, Zr, Te and U) as homogeneous catalysts. Although sufficiently soluble compounds of these transition metals generally may be suitable as homogenous catalysts, commononly available insoluble compounds, especially inorganic, in general are ineffective as catalyst. For example, U.S. 3,350,442 discloses that epoxidation of propylene with cumene hydroperoxide employing insoluble vanadium pentoxide as catalyst results in a propylene oxide yield (6%) which is little better than that obtained with no catalyst (4%). Similarly, inorganic compounds, particularly the oxides, of the metals disclosed in U.S. 3,351,635, are generally ineffective as catalysts. For example, as the result of experimentation, it has been found that in the reaction of 1-octene with t-butylhydroperoxide, a commercial $TiO_2$ gave a 50% conversion of hydroperoxide but essentially zero selectivity to 1-octene oxide; $ZrO_2$ gave a 76.7% conversion of hydroperoxide but only a 1% selectivity to 1-octene oxide; $Nb_2O_5$ gave 9% conversion of hydroperoxide and essentially zero selectivity to 1-octene oxide; $Ta_2O_5$ gave an 11% conversion of hydroperoxide but only a 5% selectivity to 1-octene oxide; $CrO_3$ gave a 99% conversion of hydroperoxide but only a 22% selectivity to 1-octene oxide; $WO_3$ gave an 85% conversion of hydroperoxide but only an 8% selectivity to 1-octene oxide; $Re_2O_7$ gave an essentially quantitative conversion of hydroperoxide but essentially zero selectivity to 1-octene oxide; $TeO_2$ gave a 33% conversion of hydroperoxide but only a 7% selectivity to 1-octene oxide; $SeO_2$ gave a 97% conversion of hydroperoxide but essentially a zero selectivity to 1-octene oxide and $UO_2$ gave a 55% conversion of hydroperoxide but only 5% selectivity to 1-octene oxide. It would be of advantage, however, to effect the epoxidation of olefins with insoluble catalysts in a heterogeneous system, i.e., with catalyst compositions which are substantially insoluble in the reaction mixture, since heterogeneous catalyst systems generally exhibit a number of operational advantages for large-scale industrial operations. For example, heterogeneous catalyst systems do not require elaborate means for separation of catalyst and reaction products due to the insolubility of the catalyst in the reaction mixture.

SUMMARY OF THE INVENTION

It has now been found that olefin oxides are produced by the reaction of an organic hydroperoxide and an olefinically unsaturated organic compound in the presence of an inorganic siliceous solid having a high surface-to-mass ratio and having a surface of silanol groups (SiOH) as catalyst. The catalyst is characterized by being relatively inexpensive as compared to prior art transition metal catalysts and is heterogeneous, i.e., substantially insoluble in the epoxidation reaction mixture.

DESCRIPTION OF PREFERRED EMBODIMENTS

The catalyst

The catalyst of the invention is an inorganic siliceous solid characterized by having a relatively large surface area and having a surface of silanol groups. Although it is not desired to be bound by any particular theory, it is considered likely that active catalytic sites of the siliceous solid are silanol groups on the siliceous solid surface, i.e., hydroxyl groups chemically bonded to surface silicon atoms, frequently known in the art as "bound water." Hydroxyl groups or bound water are to be distinguished from physically absorbed water, most of which can be removed by drying at 150–200° C., leaving only the water which is chemically combined as silanol groups. Silanol groups, on the other hand, are partially dehydrated only by heating to 500–600° C.

According to the present invention, it is essential to use a solid inorganic siliceous material having a silanol concentraton on the surface thereof of at least about 0.1 milliequivalent per gram, preferably at least 0.5 milliequivalent per gram. Generally, the greater the concentration of silanol groups, the greater will be the catalyst activity of the siliceous solid.

The inorganic siliceous solid catalysts are further characterized by having large surface areas in relation to their mass. The term used herein and one normally used in the art to express the relationship of surface area to mass is "specific surface area," Numerically, specific surface area will be expressed as in square meters per gram ($m^2$/g.). Generally, the siliceous solid catalysts of the invention have an average surface area of at least 25 $m.^2$/g. and preferably the average specific surface area is at least 100 $m.^2$/g. In terms of the surface area, the silanol concentration of the siliceous solid is generally from about 1 silanol group to about 8 silanol groups per square millimicron of siliceous solid surface.

One class of suitable inorganic siliceous solid catalysts are porous silica consisting of particles of amorphous silica flocculated or linked together so that they form relatively dense, close-packed masses. Representatives of such materials are silica gel and precipitated silica. These silica products are porous, in that they have numerous pores, voids or interstices throughout their structures. The preparation and properties of such porous siliceous solids are described by R. G. Iler, "The Colloid Chemistry of Silica and Silicates," Cornell University Press, New York, 1955, chap. VI and U.S. 2,657,149 of R. G. Iler, issued Oct. 27, 1953.

A variety of silica gels are available commercially. Commercial silica gels consisting of at least 99.8% silica and having specific surface area of about 25 m.$^2$/g. to about 800 m.$^2$/g. and pore volume of about 0.3 to 1.3 cc./g. are generally satisfactory as catalysts.

Another class of suitable inorganic siliceous solids are silica powders consisting of particles of amorphous silica flocculates in open-packed, readily disintegrated, loosely-knit aggregates. Representative of silica powders are fumed, pyrogenic silica obtained by the combustion of hydrogen and oxygen with silicon tetrachloride or tetrafluoride. Fumed silicas are produced commercially and are sold by various companies such as by Cabot Corporation as "Cab-O-Sil" and by Degussa as "Aerosil." Fumed silicas suitably employed as catalyst generally consist of at least 99.8% silica and have surface area of about 50 m.$^2$/g. to about 400 m.$^2$/g., particle size of about 0.007 micron to about 0.05 micron, and about 3 silanol groups per 100 A.$^2$. With some commercial grades of fumed silica, it is desirable to partially hydrate the fumed silica surface by treatment with water at elevated temperatures, e.g., 200–400° C., to increase the silanol concentration and thereby increase the catalytic activity.

Another class of suitable inorganic siliceous solids are silicate gels of alkali metals, e.g., lithium, sodium, potassium, rubidium and cesium, and alkaline earth metals, e.g., beryllium, magnesium, calcium, strontium and barium. Alkali and alkaline earth metal silicate gels are characterized by a gelatinous, amorphous, porous structure and by having large surface areas in relation to their mass. Generally, suitable alkali and alkaline earth metal silicate gel catalysts have pore volumes of about 0.3 to 1.3 cc./g. and have an average surface area of at least 25 m.$^2$/g. and preferably the average specific surface area is at least 100 m.$^2$/g.

Alkali and alkaline earth metal silicate gels are known compositions and are generally prepared by gelling a solution of a soluble alkali or alkaline earth silicate compound in water by conventional procedures as described, for example, by J. G. Vail "Soluble Silicates" (A.C.S. Monograph Series) Reinhold Publishing Corporation, New York, 1952. In general, suitable alkali and alkaline earth silicate gels contain about 2% to 50% by weight of alkali or alkaline earth metal oxide based on total composition, but amounts from about 5% to about 25% by weight on the same basis are preferred. Preferred alkali and alkaline earth metal silicate gels are sodium, magnesium and calcium silicate gel. One particularly preferred alkaline earth metal silicate gel is magnesium silicate gel (magnesia-silica) which is sold commercially by the Floridin Company as "Florisil" and manufactured as disclosed in U.S. 2,393,625 of Simmons, issued Jan. 29, 1946.

Other suitable inorganic solids are siliceous materials in chemical combination or physical admixture with non-interfering substances, especially those that are inert to the reactants and products. Of course, other substances that are known to catalyze the same reaction may also be present as long as they do not unduly interfere with catalytic activity of the siliceous solid. However, suitable inorganic solid catalysts contain a major proportion of silica. In general, inorganic siliceous solid catalysts contain at least 50% by weight silica, preferably at least 75% by weight silica. Preferred inorganic siliceous solid catalysts are those consisting essentially of pure silica and alkaline earth metal silicate gels, especially silica gel and magnesium silicate gel.

The olefinic reactant

The process of the invention is generally applicable to the epoxidation of any organic compound having at least one aliphatic, olefinically unsaturated carbon-carbon double bond, and generally of from 2 to 60 carbon atoms, but preferably of from 2 to 30 carbon atoms. The olefinic reactant is an acyclic, a monocyclic, a bicyclic or a polycyclic olefin and is a monoolefin, diolefin or polyolefin. The olefinic linkages of diolefins and polyolefins are either conjugated or non-conjugated. The olefinic reactant preferably is hydrocarbon containing only atoms of carbon and hydrogen, but it can be a substituted-hydrocarbon additionally containing relatively stable functional groups incorporating atoms such as oxygen, halogen, sulfur and nitrogen.

Suitable hydrocarbon monoolefins include acyclic alkenes, of from 2 to 40 carbon atoms such as propylene, isobutylene, hexene-3, decene-1, triacontene-8, and tetracontene-1; monocyclic monoolefins such as cyclopentene, methylenecyclohexane, allylbenzene, and 1 - phenyl-3-methyl-3-hexen-1-yne; bicyclic monoolefins of fused or separate rings such as bicyclo(2.2.2)oct - 2-ene, bicyclo-(4.3.0)non-2-ene, and 1,2-dihydronaphthalene; polycyclic monoolefins such as tricyclo(4.2.1$^{2,5}$)non-7-ene, quadricyclo(2.2.1.2$^{2,6}$0$^{3,5}$)non-8-ene, 3,4,7,8-tetraphenyltricyclo-(4.2.1.0$^{2,5}$)non-7-ene and 2-cholestene.

Suitable hydrocarbon diolefins include acyclic diolefins such as butadiene, 1,4 - pentadiene and 1,6 - heptadiene; monocyclic diolefins such as 1,3-cyclohexadiene, 1,5-cyclooctadiene, 1,4 - dimethylenecyclohexane, 1,4-divinylbenzene, and 1,4-dipropenylbenzene; bicyclic diolefins of fused or separate rings such as bicyclo(2.2.1)hepta-2,5-diene, bicyclo(3.3.1)octa - 2,6-diene, 1-cyclohexylcyclohexa-1,3-diene, 2,3-diphenyl-1,5-hexadiene; polycyclic diolefins such as tricyclo(4.2.1.0.$^{2,5}$)nona-3,7-diene, quadricyclo(4.4.1.0$^{2,5}$0$^{7,10}$)undeca - 3,8-diene, and 2,4-cholestadiene.

Suitable hydrocarbon polyolefins include cyclic polyolefins such as 1,3,5 - cyclooctatriene, 1,5,9-cyclododecatriene and bicyclo(4.2.1)nona - 2,4,7-triene and acyclic polyolefins such as 1,3,5-hexatriene, squalene, carotene and polyisoprene.

Among the oxygen-containing substituted-hydrocarbon olefins which are suitable epoxidized by the process of the invention are, for example, (a) unsaturated ethers such as diallyl ether, 3-vinyltetrahydropyan, and phenyl allyl ether; (b) olefinically unsaturated esters such as ethyl methacrylate, allyl acetate, methyl 5-hexenoate and δ-lactone of 5-hydroxy-2-pentenoic acid; (c) olefinic ketones such as methyl allyl ketone, mesityl oxide and oct-1-en-5-one; (d) olefinic aldehydes such as crotonaldehyde, cinnamyl aldehyde and 1,2,5,6-tetrahydrobenzaldehyde; (e) olefinic opeoxides such as 1,2-epoxy-5-hexane; and (f) oxygen-containing compounds such as soy bean oil and corn oil.

Exemplary suitable halogen-containing substituted-hydrocarbon olefins are allyl chloride, methallyl chloride and cyclohexenyl chloride.

Suitable nitrogen-containing substituted hydrocarbon olefins are, for example, olefinic nitriles such as 1-cyano-2-cyclopentene, 3-cyanocyclohexene and 4-cyanobutene-2; olefinic amides such as oleamide and N-methyloleamide; olefinic nitro compounds such as 4-nitro-1-butene, lactam of 6-amino-4-hexenoic acid and allylpyrrolidone.

In view of the highly polar character of the silical groups of the inorganic siliceous solid catalyst and its absorptivity toward polar organic substances, the olefinic reactant is preferably free of functional groups containing active hydrogen atoms, e.g., hydroxy, carboxyl, thio, amino and like groups.

A preferred class of olefinic reactants are olefins of from 3 to 40 carbon atoms, of up to 4 olefinic linkages and represented by Formula I

(I)

wherein R independently is hydrogen, hydrocarbyl or substituted hydrocarbyl additionally containing halogens of atomic number from 7 to 53 inclusive, i.e., fluorine, chlorine, bromine and iodine, and oxygen incorporated in functional groups such as hydrocarbyloxy, hydrocarboyl, hydrocarbyloxycarbonyl, hydrocarboyloxy and epoxy with the proviso that any two hydrocarbyl R groups can be joined to form a 3 to 9-membered carbocyclic ring.

Suitable hydrocarbyl R groups include alkyl such as ethyl, butyl and octyl; cycloalkyl, such as cyclobutyl and cyclohexyl; alkenyl such as propenyl, hexenyl and decenyl; cycloalkenyl such as cyclopentyl and cyclohexenyl; alkaryl or 1 or 2 fused or separate 6-membered rings such as tolyl and methylnaphthyl; aryl such as phenyl and naphthyl; and aralkyl such as phenylethyl and naphthylbutyl. Suitable halogen-containing hydrocarbyl groups are therefore groups such as chloromethyl, p-bromophenyl and trifluoromethyl. Illustrative hydrocarbyloxy functional groups are alkoxy such as methoxy and propoxy; aralkoxy such as benzyloxy; alkaryloxy such as p-methylphenoxy; and aryloxy such as p-chlorophenoxy and naphthoxy. Illustrative hydrocarboyl groups are alkanoyl such as acetyl and hexanoyl; and aryloyl such as benzoyl, toluoyl and xyloyl. Illustrative hydrocarboxyloxy groups are alkanoyloxy, such as acetoxy and decanoyloxy, and aryloyloxy such as benzoyloxy, o-toluoyloxy and naphtholyloxy. Illustrative hydrocarbyloxycarboxyl groups are carboalkoxy such as carbomethoxy and carbethoxy; carboaralkoxy such as carbobenzyloxy; and carboaryloxy such as carbophenoxy and carbonaphthoxy. Exemplary olefins of Formula I containing both hydrocarbyl and substituted-hydrocarbyl R groups are illustrated by the olefinic reactans specified in the previous paragraphs.

The olefinic hydrocarbons of Formula I are particularly preferred as reactants. When substituted-hydrocarbon olefinic reactants are to be epoxidized, it is preferred to use substances which contain only a single functional group, e.g., olefinic reactants of Formula I wherein only one R group is substituted-hydrocarbyl.

The organic hydroperoxide

The process of the invention is broadly applicable to the use of any organic compound having at least one hydroperoxide moiety. One suitable class of organic hydroperoxides having from 3 to 20 carbon atoms is represented by Formula II $$R'OOH \qquad (II)$$

where R' is a hydrocarbyl group or a substituted-hydrocarbyl group additionally containing halogens of atomic number 7 to 53 inclusive, e.g., fluorine, chlorine, bromine and iodine, and oxygen incorporated into functional groups such as hydroxy, hydrocarbyloxy, hydrocarboyl, hydrocarbyloxycarbonyl, hydrocarboyloxy, and the like.

Suitable organic hydroperoxides of Formula II therefore include tertiary substituted- and unsubstituted-hydrocarbon hydroperoxides such as tertiary alkyl hydroperoxides, e.g., tertiary butyl hydroperoxide, tertiary amyl hydroperoxide, 1 - chloromethyl-1-bromomethylprop-1-yl hydroperoxide, tertiary aralkyl hydroperoxides, e.g., α,α-dimethylbenzyl hydroperoxide and α,α-diethylbenzyl hydroperoxide; secondary substituted- or unsubstituted- hydrocarbon hydroperoxides such as secondary alkyl hydroperoxides, e.g., cyclohexyl hydroperoxides, isopropyl hydroperoxide, α-hydroperoxy diisopropyl ketone and 3-hydroperoxycyclohexene; secondary aralkyl hydroperoxides, e.g., α-methylbenzyl hydroperoxide, 1-(1-hydroperoxyethyl)-4-chlorobenzene, tetralin hydroperoxide, and 1,4-dihydronaphth-1-yl hydroperoxide; primary substituted and unsubstituted hydrocarbon hydroperoxides such as 1-propyl hydroperoxide, but-2-en-1-yl hydroperoxide, benzyl hydroperoxide, p-bromobenzyl hydroperoxide, and o-methoxybenzyl hydroperoxide.

Particularly useful hydroperoxides are aralkyl hydroperoxides wherein the hydroperoxy group is on a carbon atom attached directly to the aromatic ring, e.g., α-hydroperoxy-substituted aralkyl compounds such as α-methylbenzyl hydroperoxide.

Hydrocarbon hydroperoxides are preferred for use in the process of the invention. Particularly preferred hydrocarbon hydroperoxides are secondary and tertiary hydroperoxides of up to 15 carbon atoms, especially tertiary alkyl hydroperoxides and aralkyl hydroperoxides wherein the hydroperoxy group is on a carbon atom attached directly to an aromatic ring.

In the epoxidation reaction, the molar ratio of olefinic reactant to hydroperoxide can vary over a wide range and a molar excess of either the olefinic reactant or hydroperoxide of up to as high as 100:1 can be used. In general, molar ratios of olefinic reactant to hydroperoxide varying from about 50:1 to about 1:10 are satisfactory, although it is preferred to employ molar ratios of olefinic reactant to hydroperoxide of about 20:1 to about 1:1.

The organic hydroperoxide reactant may be supplied in dilute or concentrated, purified or unpurified form. Hydrocarbon hydroperoxides are economically prepared by direct oxidation as exemplified by U.S. 2,845,461 of Winkler et al. and U.S. 2,867,666 of Erickson et al. In such oxidations molecular oxygen is passed through hydrocarbon to convert at least a portion of the hydrocarbon to hydroperoxide. Generally, the hydroperoxide is present in concentration of about 5 to 70% by weight in the starting hydrocarbon. Side products such as alcohols and other impurities are also often present in minor amount. This oxidation product may be suitably used without treatment although it may in some cases be preferably to concentrate or purify the hydroperoxide such as by distillation.

The reaction conditions

The process of the invention is conducted in the liquid phase in diluents which are liquid at reaction temperature and pressure and are substantially inert to the reactants and the products produced therefrom. Illustrative suitable diluents are cycloalkanes such as cyclohexane and alkanes such as octane, decane, and dodecane. In certain modifications of the epoxidation process, a portion of the olefinic reactant serves as the reaction diluent and no added diluent is needed. In most instances, however, added diluent is used and amounts up to about 20 moles of diluent per mole of organic hypdroperoxide are satisfactory. The process is preferably conducted in an inert reaction environment so that the presence of reactive materials such as water is desirably avoided. Suitable reaction conditions are therefore substantially anhydrous.

The epoxidation reaction is suitably conducted by any of a variety of procedures. In one modification, the entire amounts of reactants, the catalyst and the diluent are charged to an autoclave or similar pressure reactor and the reaction mixture is maintained with agitation at reaction temperature and pressure for the desired reaction period. In another modification, one reactant is added to the remaining reaction mixture components in increments, as by adding the organic hydroperoxide to a mixture of the olefinic reactant, the catalyst and the diluent maintained at reaction temperature and pressure. In yet another modification, reaction is effected in a continuous manner as by contacting the olefin reactant, the organic hydroperoxide and the diluent during passage through a reaction zone in which the solid catalyst is maintained in particulate form. In still another modification, which is a preferred modification, a portion of the alcohols product produced from the hydroperoxide reactant is continuously removed from the reaction mixture during the course of the epoxidation reaction. By any modification, the epoxidation process is conducted at moderate temperatures and pressures. Suitable reaction temperatures vary from about 0° C. to about 200° C. but preferably from 25° C. to 200° C. The reaction is conducted at or above atmospheric pressure. The precise pressure is not critical so long as the reaction mixture is maintained substantially in a non-gaseous phase.

Typical pressures vary from about 1 atmosphere to about 100 atmospheres.

At the conlusion of the reaction, the product mixture is separated and the products are recovered by conventional methods such as fractional distillation, selective extraction, filtration and the like. The reaction diluent, the catalyst and any unreacted olefin or hydroperoxide are recycled for further utilization.

The products

According to the process of the invention the olefinic reactant is epoxidized to the corresponding olefin oxide. In the case of diolefinic reactants, it is possible to epoxidize only one of the olefinic linkages or both. By way of illustration, butadiene is epoxidized to 1,2-epoxy-3-butene and/or 1,2-epoxy-3,4-epoxybutane and 1,3-divinylcyclopentane is epoxidized to 1,3-bis(epoxyethyl)cyclopentane and/or 1-epoxyethyl-3-vinylcyclopentane. Similarly, in the case of polyolefinic reactants, it is possible to epoxidize only one or several or all of the ethylenic linkages. By way of illustration, 1,3,5-triallyl benzene is epoxidized to 1-(2,3-epoxypropyl)-3,5-diallylbenzene, 1,3-di(2,3-epoxypropyl)-5-allylbenzene and/or 1,3,5-tri-(2,3-epoxypropyl) benzene and squalene is epoxidized to squalene hexaoxide, squalene pentaoxide, squalene tetraoxide, squalene trioxide, squalene dioxide and/or squalene monoxide.

The olefin oxide products are materials of established utility and many are chemicals of commerce. For example, illustrative olefin oxides which are readily prepared by the process of the invention such as propylene oxide, 1,2-epoxybutane, 1,2-epoxydodecane and 1,2-epoxyhexadecane are formulated into useful polymers by polymerization or copolymerization as disclosed by U.S. Pats. 2,815,343, 2,871,219 and 2,987,489. Propylene oxide is currently prepared commercially by the classic chlorohydrin process.

According to the process of the invention the organic hydroperoxide is converted to the corresponding alcohol. The alcohol can be recovered as a co-product of the process or reconverted to the hydroperoxide by procedures such as dehydration to olefin, hydrogenation of the olefin and oxidation to hydroperoxide, or by hydrogenolysis to hydrocarbon followed by oxidation to hydroperoxide.

To further illustrate the improved process of the invention, the following examples are provided. It should be understood that the details thereof are not to be regarded as limitations as they may be varied as will be understood by one skilled in this art.

EXAMPLES I–VII

In a series of experiments the epoxidation of 1-octene with t-butylhydroperoxide was conducted in the presence of a variety of commercial silica gel products (Davison Chemical Company). Each experiment was conducted by charging 2 g. of the indicated silica gel catalyst, 73 g. of 1-octene, 9 g. of t-butylhydroperoxide and the indicated amount of nonane diluent to a 100 ml. glass reactor and maintaining the reaction mixture at the indicated reaction temperature. The silica gel employed, reaction conditions, the hydroperoxide conversion and the selectivity to 1-octene oxide based on converted hydroperoxide are provided in Table I.

EXAMPLE VIII

A 25 ml. sample of silicon tetrachloride (Matheson, Coleman and Bell, semi-conductor grade) was added dropwise over a period of 20 minutes to 500 ml. of deionized water. The resulting mixture was evaporated on a steam bath under reduced pressure and the silica residue dried at a temperature of 120° C. overnight.

A 1 g. sample of the silica product was contacted with 41.2 g. of cyclohexene, 4.5 g. of t-butylhydroperoxide and 2.1 g. of nonane in a 100 ml. glass reactor for 23 hours at 80° C. Analysis of the product mixture showed a 28% conversion of t-butylhydroperoxide and a 70% selectivity to cyclohexene oxide based on converted hydroperoxide.

EXAMPLE IX

A mixture of 2 g. of commercial silica gel (Davison grade 12 having a surface area of 800 m.$^2$/g.), 73 g. of 1-octene and 9 g. t-butylhydroperoxide was charged to a glass reactor equipped with a distillation head. The glass reactor was heated at a temperature of 112–118° C. and the t-tutyl alcohol product formed, B.P. 83° C., was continuously removed through the distillation head during the course of reaction (20 hours). Analysis of the product mixture remaining in the glass reactor showed a 63% conversion of the t-butylhydroperoxide and an 85% selectivity to 1-octene oxide based on hydroperoxide.

EXAMPLE X

A mixture of 2 g. of commercial magnesium silicate gel (Floridin Company; 15.5% w. MgO, 84% w. SiO$_2$ and 0.5% w. Na$_2$SO$_4$; surface area of 298 m.$^2$/g.), 41 g. of cyclohexene, 4.5 g. of t-butylhydroperoxide and 2.1 g. of nonane diluent was charged to a 100 ml. glass reactor and maintained at a temperature of 84° C. for 23 hours. Analysis of the product mixture showed a 63% conversion of t-butylhydroperoxide and an 87% selectivity to cyclohexene oxide based on converted hydroperoxide.

EXAMPLE XI

A mixture of 2 g. of commercial magnesium silicate (Floridin Company; 15.5% MgO, 84% SiO$_2$ and 0.5% Na$_2$SO$_4$; surface area of 298 m.$^2$/g.) 73 g. of 1-octene and 9 g. of t-butylhydroperoxide was charged to a glass reactor equipped with a distillation head. The reactor was heated at a temperature of 110–112° C. and the t-butyl alcohol product, B.P. 83° C., was continuously removed as formed through the distillation head during the course of the reaction (20 hours). Aanalysis of the product mixture in the reactor showed a 55% conversion of hydroperoxide and a 77% selectivity to 1-octene oxide based on converted hydroperoxide.

EXAMPLE XII

By a procedure similar to that of Example X, a mixture of 0.5 g. of magnesium silicate gel, 18 g. of 4-cyanocyclohexene, 2.3 g. of t-butylhydro-peroxide and 1.7 g. of nonane was reacted at 123–133° C. for 6½ hours. Analysis of the product mixture showed a 73% conversion of t-butylhydroperoxide and a 20% selectivity to 4-cyanocyclohexene oxide based on converted hydroperoxide.

TABLE I

| | Silica gel catalyst | | | | | | Percent | |
|---|---|---|---|---|---|---|---|---|
| Run | Mesh | Pore volume, ml./g. | Surface area, m.$^2$/g. | Nonane diluent, g. | Reaction time, hr. | Temp., °C. | Hydroperoxide conversion | Epoxide selectivity |
| I | 28 | 0.40 | 750 | 0 | 22 | 110–112 | 62.2 | 69.2 |
| II | 4 | 1.15 | 340 | 2.1 | 20 | 109–112 | 57.9 | 34.7 |
| III | 8–16 | | | 2.1 | 20 | 110–112 | 43.4 | 70.3 |
| IV | 200 | 0.45 | 800 | 0 | 21 | 100–110 | 77.95 | 38.4 |
| V | 100–200 | 0.40 | 700 | 2.1 | 21 | 110–112 | 54.6 | 73 |
| VI | 60–200 | 0.40 | 700 | 0 | 20 | 112–118 | 67.4 | 81 |
| VII | 60–200 | 1.15 | 340 | 0 | 22 | 109–112 | 57 | 73.3 |

EXAMPLE XIII (A) A hydrated pyrogenic silica was prepared by contacting 1.9 g. of commercial pyrogenic silica having surface area of 390 m.²/g. and a particle size of 0.007 micron and 35 ml. of deionized water in a sealed glass ampoule maintained at 210° C. for 7 days. The silica product was recovered and dried at 125° C. for 20 hours.

A 1 g. sample of silica product was contacted with 36.5 g. of 1-octene, 4.5 g. of t-butylhydroperoxide and 2.1 g. of nonane in a 100 ml. glass reactor at 106–111° C. for 22 hours. Analysis of the product mixture showed a 38% conversion of the t-butylhydroperoxide and a 20.9% selectivity to 1-octene oxide based on t-butylhydroperoxide converted.

(B) For comparison, a 2 g. sample of the pyrogenic silica (unhydrated) employed to prepare catalyst of Example XIIIA, 73 g. of 1-octene, 9 g. t-butylhydroperoxide and 4.2 g. of nonane were contacted at 110° C. for 20 hours by a procedure similar to that of Example XIIIA. Analysis of the product mixture showed a 30.2% conversion of the t-butylhydroperoxide and a 10.8% selectivity to 1-octene oxide based on t-butylhydroperoxide converted.

EXAMPLE XIV

A 1 g. sample of pyrogenic silica having a surface area of 390 m.²/g. (Cabot Corporation EH–5 Cab-O-Sil) was contacted with 26 g. of cyclohexene, 4.5 g. of t-butylhydroperoxide and 1.5 g. nonane in a 100 ml. glass reactor at 82° C. for 16 hours. Analysis of the product mixture showed a 32% conversion of the t-butylhydroperoxide and a 73% selectivity to cyclohexene oxide based on t-butylhydroperoxide converted.

EXAMPLE XV

In a series of experiments a variety of inorganic metal oxide compounds was tested as heterogeneous catalysts for the epoxidation of 1-octene with t-butylhydroperoxide (TBHP). In each experiment a 1 g. sample of the indicated metal oxide compound was contacted with 36.5–42 g. of 1-octene and 4.5–5.5 g. of t-butylhydroperoxide. The reaction conditions and results are provided in Table II.

TABLE II

| Catalyst: | Nonane diluent, g. | Reaction time, hr. | Temp., °C. | Percent Hydroperoxide conversion | Percent Epoxide selectivity |
|---|---|---|---|---|---|
| $TiO_2$ (Cabot Corp.) | 2.1 | 20 | 110 | 50 | 0 |
| $TiO_2$ (Degussa, Inc.) | 2.1 | 19 | 110 | 40 | 0 |
| $ZrO_2$ | 2.1 | 20 | 107 | 76.7 | 1 |
| $NbSO_5$ | 0 | 4½ | 115 | 9 | 0 |
| $Ta_2O_5$ | 0 | 4½ | 110 | 11 | 5 |
| $CrO_3$ | 0 | ½ | 108 | 99 | 22 |
| $WO_3$ | 0 | 22 | 111 | 85 | 8 |
| $Re_2O_7$ | 0 | 4 | 110 | 100 | 0 |
| $TeO_2$ | 0 | 22 | 110 | 33 | 7 |
| $SeO_2$ | 0 | 3 | 110 | 97 | 0 |
| $UO_2$ | 0 | 20 | 110 | 55 | 5 |

EXAMPLE XVI

A 75 cc. sample of sodium silicate sol (25.3% wt. silicate, 6.7% wt. sodium oxide and 68.0% wt. water; Baumé gravity of 35 at 68° F.) was added with stirring at 25° C. to a solution of 24 g. $Ca(NO_3)_2 \cdot 4H_2O$ in 1200 cc. of deionized water. The resulting calcium silicate gel precipitate was filtered, washed with water and dried at 675° C. for 15 minutes.

A 1 g. sample of calcium silicate gel was contacted with 36.5 g. of 1-octene and 4.5 g. of t-butylhydroperoxide in a 100 ml. reactor at 90° C. for 22 hours and then at 107° C. for 24 hours. Analysis of the product mixture showed a 49% conversion of hydroperoxide and 35% selectivity to 1-octene oxide based on converted hydroperoxide.

We claim as our invention:

1. A process of epoxidizing an olefinically unsaturated organic compound by reacting the olefinically unsaturated compound with an organic hydroperoxide in the presence of an inorganic siliceous solid containing a major proportion of silica and having a surface of silanol groups and specific surface area of at least 25 m.²/g. in the liquid phase at a temperature of from about 25° C. to about 200° C.

2. The process of claim 1 wherein the inorganic siliceous solid contains at least 75% by weight silica, has a silanol concentration of at least 0.5 milliequivalent per gram and is selected from silica gel, alkali metal silicate gel and alkaline earth metal silicate gel.

3. The process of claim 2 wherein the olefinically unsaturated compound has from 2 to 60 carbon atoms and from 1 to 4 olefinic linkages and contains only the atoms of carbon and hydrogen.

4. The process of claim 3 wherein the organic hydroperoxide is a hydrocarbon hydroperoxide of from 3 to 20 carbon atoms.

5. The process of claim 4 wherein the hydrocarbon hydroperoxide is tertiary alkyl hydroperoxide.

6. The process of claim 4 wherein the hydrocarbon hydroperoxide is an aralkyl hydroperoxide wherein the hydroperoxy group is on a carbon atom attached directly to an aromatic ring carbon.

7. The process of claim 5 wherein the olefinically unsaturated compound is an alkene of from 3 to 40 carbon atoms.

8. The process of claim 7 wherein the olefinically unsaturated compound is 1-octene.

9. The process of claim 7 wherein the alkaline earth metal silicate gel is magnesium silicate gel.

10. The process of claim 9 wherein the olefinically unsaturated compound is 1-octene.

11. The process of claim 7 wherein the alkaline earth metal silicate is calcium silicate gel.

No references cited.

NORMA S. MILESTONE, Primary Examiner